Aug. 4, 1936.  B. LIEBOWITZ  2,050,191
MACHINE FOR ADHESIVELY UNITING THE PLIES
OF MULTIPLE PLY ARTICLES OF APPAREL
Filed July 3, 1935  5 Sheets-Sheet 3

INVENTOR
BENJAMIN LIEBOWITZ
BY
ATTORNEY

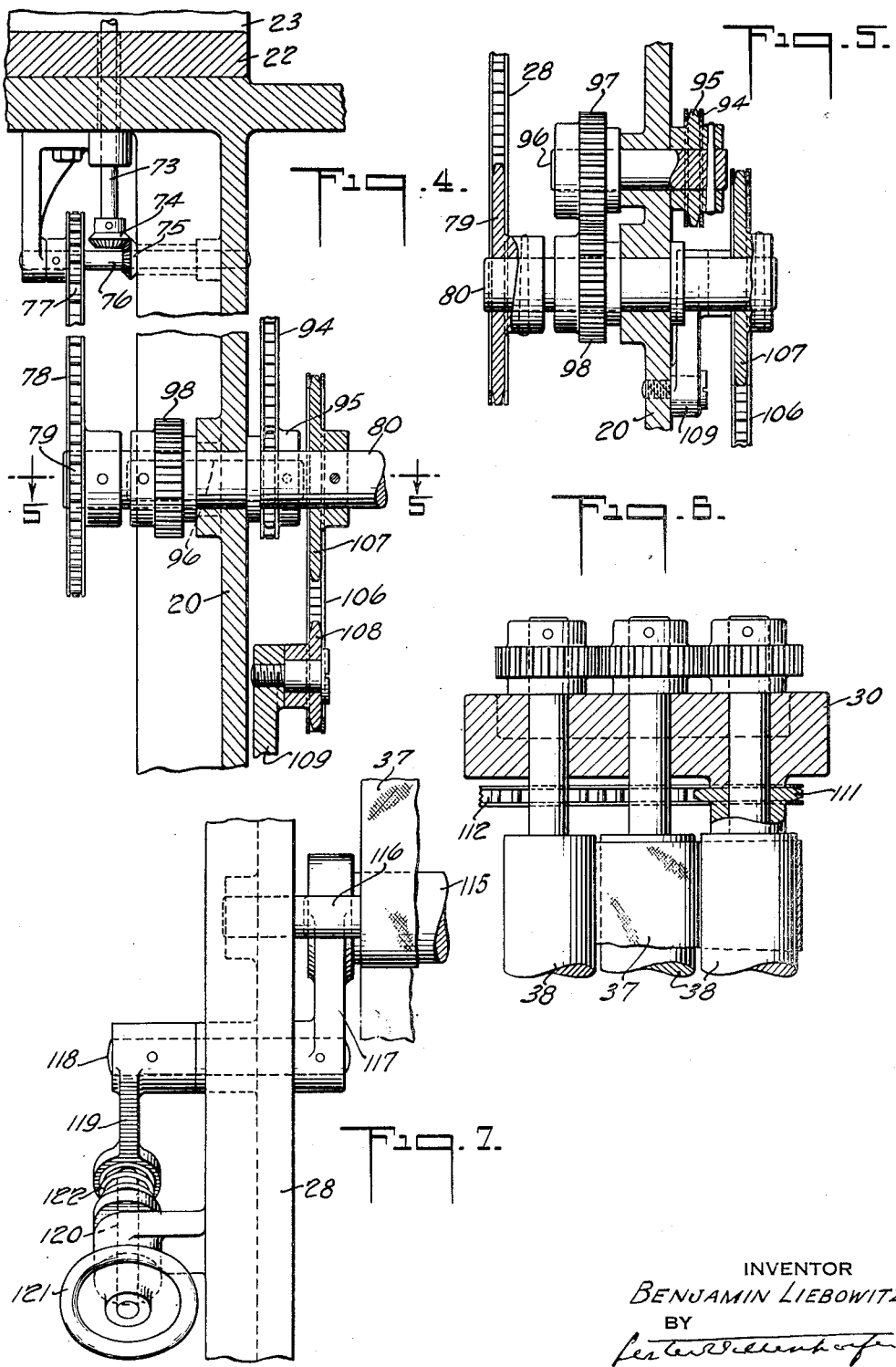

Aug. 4, 1936.                B. LIEBOWITZ                2,050,191
              MACHINE FOR ADHESIVELY UNITING THE PLIES
                 OF MULTIPLE PLY ARTICLES OF APPAREL
                      Filed July 3, 1935            5 Sheets-Sheet 5
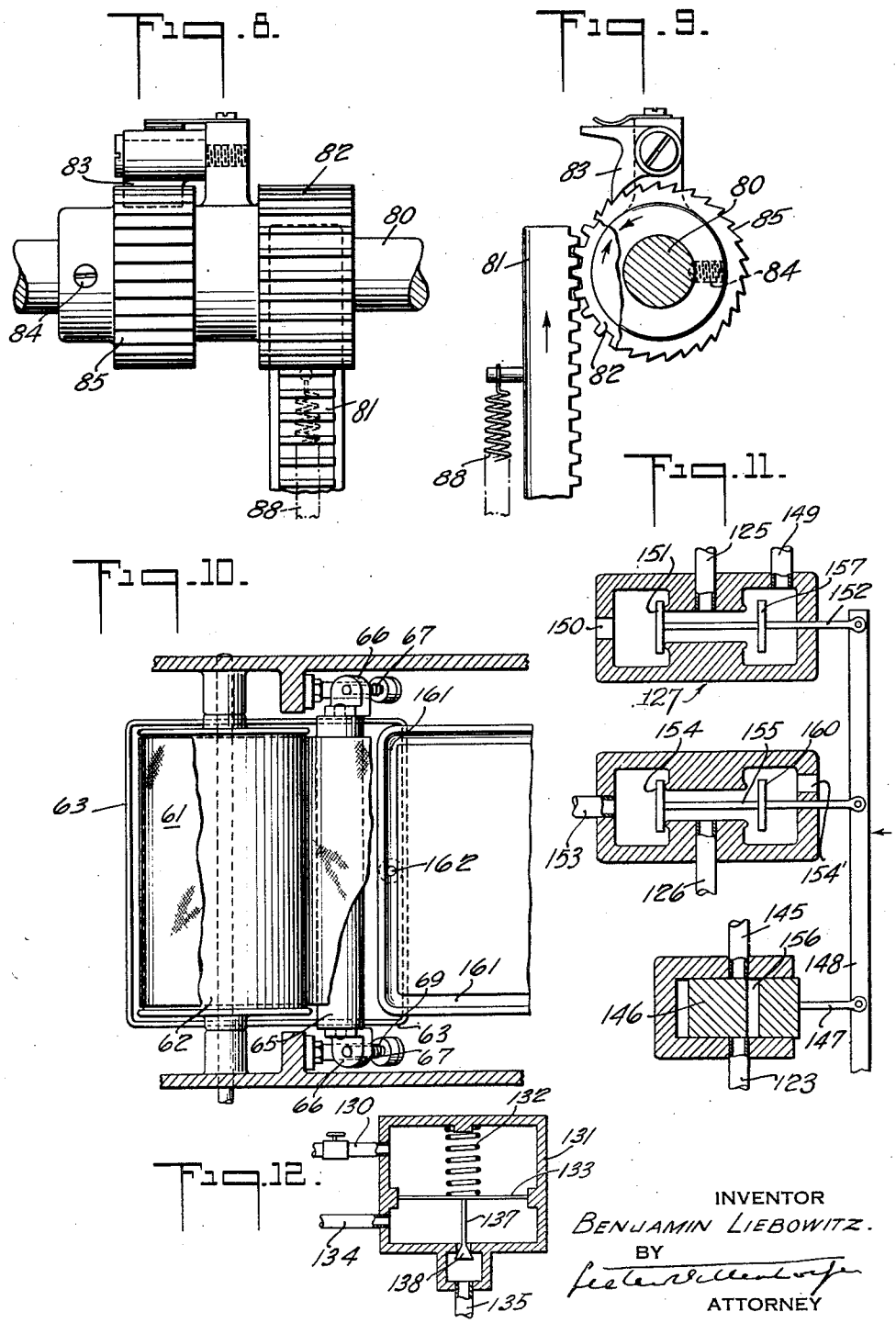
INVENTOR
BENJAMIN LIEBOWITZ.
BY
ATTORNEY Patented Aug. 4, 1936

2,050,191

UNITED STATES PATENT OFFICE 2,050,191

MACHINE FOR ADHESIVELY UNITING THE PLIES OF MULTIPLE PLY ARTICLES OF APPAREL

Benjamin Liebowitz, New York, N. Y., assignor to Trubenizing Process Corporation, New York, N. Y., a corporation of New York Application July 3, 1935, Serial No. 29,626

18 Claims. (Cl. 154—1)

The invention relates to a machine for adhesively uniting the plies of a multiple ply article of apparel, such, for instance, as collars, cuffs, or the like, as shown in my Patents Nos. 1,968,409 and 1,968,410, both of July 31, 1934.

In the manufacture of such articles, a lining piece is inserted between the plies. This lining piece is composed of, in whole or in part, or carries, a substance, such for instance as cellulose acetate, which becomes adhesive when treated with a suitable solvent. When thus rendered adhesive, and when pressed into the plies of the article, and particularly when the plies with the adhesive between them have been subjected to pressure, the plies become permanently united by the adhesive, heat being applied to remove the solvent. The machine of the present invention is for applying the solvent, and for applying the pressure and heat involved in the above process, to articles of apparel which, as fed into the machine, have the latently adhesive lining pieces laid between the plies thereof.

It is an object of the invention to provide a machine having a compartment or station where the articles are treated with a solvent, and at which the articles when so treated are pressed to force the adhesive into the plies, and having other compartments or stations at which the plies of the solvent treated articles are heated to remove the solvent.

It is a further object of the invention to provide a machine having a plurality of presses whereby the articles are pressed in successive stages, and to feed the articles through the machine from station to station on one conveyor, the conveyor having intermittent advance movement equal in each instance to the distance between the stations, and the presses operating between the intermittent movements of the conveyor.

Since ordinarily the time required for removing the solvent from the moistened articles is greater than the time required for its application, a feature of the invention is the employment of two or more stations for removing the solvent and the provision of a conveyor which has periods of rest of equal duration at each station.

Additional features of the invention are: a novel means for preventing adhesion of the articles to the platens of the presses, and for assuring ejection of the articles from the machine in due course; a novel means for feeding the solvent to the articles on the conveyor; a novel system for applying a pneumatic-hydraulic pressure to close the presses and a greater pressure for exerting an additional squeeze on the platens of the presses after the presses are closed; and a novel co-ordination of driving means for the conveyor and other movable parts operable at the moments when the presses are open and at rest.

Other objects and features of the invention will more fully appear from the following description. In the drawings:

Fig. 4 is a view in cross-section on the line 4—4 of Fig. 1;

Fig. 5 is a view in cross-section on the line 5—5 of Fig. 4;

Fig. 6 is a view in cross-section on the line 6—6 of Fig. 1;

Fig. 7 is a detailed view of the device for regulating the tension on the conveyor belt;

Fig. 8 is a fragmental view of gears and ratchet for driving the conveyor;

Fig. 9 is an end view of the mechanism shown in Fig. 8;

Fig. 10 is a top plan view looking from the line 10—10 of Fig. 3;

Fig. 11 is a view in cross-sectional elevation through the several elements of a master valve which controls the feed of compressed air and oil for operating the machine; and,—

Fig. 12 is a view in cross-section through a valve which controls the flow of compressed air for applying squeeze pressure at the platens.

Figure 1:
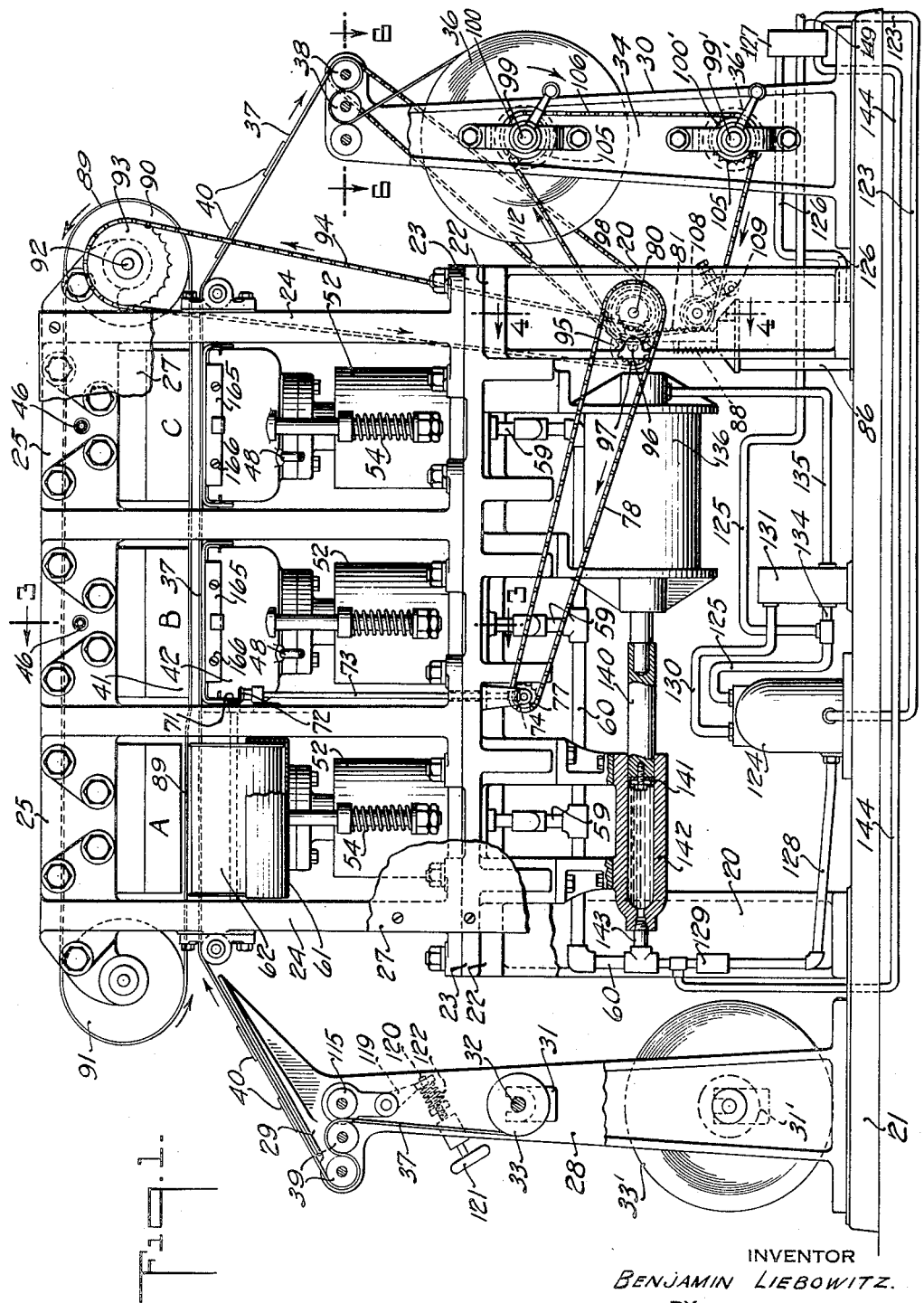
Figure 1 is a view of the machine in side elevation, one of side plates and other parts being broken away for clearer illustration of the interior.

Referring to the drawings, the framework of the machine is shown as comprising a chassis having uprights 20 supported on a bed plate 21 and having at their upper ends offsets 22 which form a table on which another part of the machine is seated. This other part of the machine comprises a base 23 from which extend uprights 24, at each side of the machine, the uprights 24 being connected by and carrying at their upper ends side pieces or bars 25.

Within the upper part of the machine, at stations or positions indicated in Fig. 1 as A, B and C, are three presses. A transverse partition indicated at 26 in Fig. 3 lies in the upper part of the machine between stations A and B, and divides the machine into two compartments, to wit, a larger compartment comprising stations B and C, and a smaller compartment comprising station A. The machine is completely enclosed at sides and ends by plates 27, and these compartments are therefore closed compartments, so that hot air from the larger compartment may be exhausted therefrom without passing into the smaller compartment. As will hereinafter be seen, the smaller compartment is a cold process compartment, and the larger compartment is a hot process compartment, and, hence, the partition to prevent passage of hot air to the smaller compartment.

Supported upon the base plate 21 at the front of the machine, see Fig. 1, is a standard 28 at the upper end of which is a table 29. Also supported upon the base plate 21 at the rear of the machine, see Fig. 1, is a standard 30. Carried by the standard 28 at the front of the machine is a bracket 31 which serves as a bearing for the shaft 32 of a delivery roll 33. The side plates 34 of the standard 30 at the rear of the machine are bored at 35 to serve as bearings for a take-up roll 36. From the delivery roll 33 at the front of the machine, a conveyor belt 37 passes upward to the table 29, thence upward and rearward over the table 29, thence horizontally rearward through the machine and the successive stations A, B and C thereof, outward and downward from the rear of the machine to the standard 30 and to the take-up roll 36 on the latter. As will hereinafter appear, rollers 38 at the top of the rear standard 30, and rollers 39 at the top of the front standard 28, effect and control an intermittent feed of the conveyor belt 37. Indicated at 40 on the conveyor belt, in Fig. 1, are articles which are placed upon the belt at the front table 29, and which, after being treated, are ejected from the machine at the rear thereof.

Figure 3:
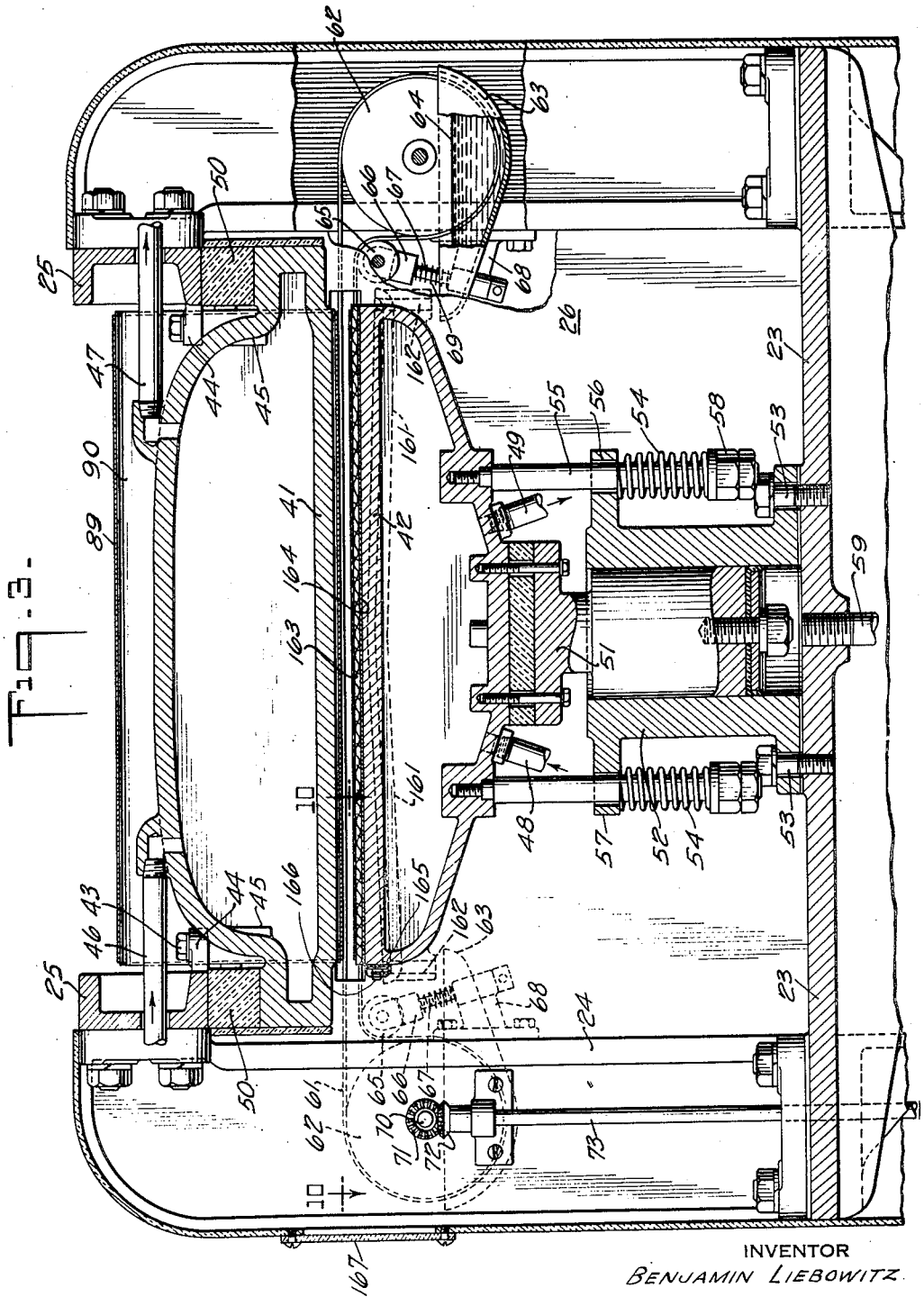
Fig. 3 is a view in cross-sectional elevation on the line 3—3 of Fig. 1.

Each of the stations A, B and C, see Fig. 3, is a press comprised of an upper platen 41 and a lower platen 42. The upper platens are fixedly connected to the upper side bars 25 by bolts 43 which pass through arms 44 on the bars 25 and into bosses 45 on the casting of the upper platens. Both the upper and lower platens are shown as hollow. In Fig. 3 the hollow upper platen is shown as heated by steam which enters through a pipe 46 and leaves through a pipe 47 and the lower hollow platen is heated by steam which enters through a pipe 48 and leaves by a pipe 49. Only the platens at stations B and C are, however, thus steam heated. As hereinbefore mentioned, station A is a cold process station and no steam heating is provided thereat. In Fig. 3 the upper platens 41 are shown as having insulating blocks 50 between the same and the bars 25 from which they are supported. This is to minimize heating of the machine frame.

The lower platens 42 in each instance are connected to and supported by a piston 51 having movement up and down in a cylinder 52. The cylinders 52 are in each instance secured to and carried by the table piece 23 of the upper part of the machine, as by bolts 53. Coil springs 54 normally hold the lower platens in depressed position and return the same to such position when free to do so. These coil springs are on rods 55, secured at their upper ends to the lower platens, passing through holes 56 in a flange 57 of the cylinder 52, and carrying at their lower ends nuts 58 against which the springs bear and by means of which the tension of the springs may be adjusted. Hydraulic pressure to lift and force the lower platen against the upper platen is supplied by oil under pressure admitted to the cylinders through pipes 59. The pipes 59 from the several cylinders connect with a pipe 60, through which by means hereinafter to be described, the hydraulic pressure is applied.

It will be understood that when the presses operate, the conveyor is at rest, and vice versa, that when the presses are released, the conveyor has its intermittent movement. This intermittent movement is a station to station movement, that is to say, it has a movement sufficient to carry articles which have been treated at station A, to station B, and those which have been treated at station B, to station C. The articles 40, as placed upon the table 29, have between the plies thereof a lining element carrying cellulose acetate or latently adhesive substance which has the property of becoming adhesive to bind the plies together when such substance is treated with a solvent. It is at station A that this solvent is applied. The action of the platens at section A is to squeeze into the plies of the articles the adhesive substance contained in the lining elements. The action of the hot platens at stations B and C is to remove the solvent and to effect adhesion by pressure. One station, B or C, might be used, except that it takes about twice as much time properly to remove the solvent from the moistened article as it does to moisten the same with the solvent.

The means by which the solvent is applied at station A is shown in Fig. 3, and is there shown to be an endless absorbent belt 61 which passes through compartment A, from side to side of the machine, around pulleys 62. The lower portions of both pulleys 62 are set in troughs 63 containing the solvent 64. The upper reach of the absorbent belt 61 lies above the conveyor belt 37, and is spaced sufficiently above the same to admit the articles 40 between the two belts. The lower reach of the absorbent belt 61 is below the conveyor belt. The lower reach of the absorbent belt is held to the pulleys 62 and brought to its proper plane below the conveyor belt by means of idlers 65 carried in trunnions 66 which are mounted for longitudinal movement on rods 67, carried by brackets 68 on the uprights 24 of the upper frame. Coil springs 69 exert such pressure on the idlers 65 as to maintain proper tension on the absorbent belt.

The movement of the absorbent belt is an intermittent movement which takes place at the time the conveyor belt receives its intermittent movement, and at the time that the pressure on the platens is released. This intermittent movement of the absorbent belt is effected as follows. On the shaft 70 to which the pulley 62 on one side of the machine is keyed, there is also keyed a beveled gear 71. Meshing this beveled gear 71 is a beveled gear 72 on a vertical shaft 73. The lower end of the shaft 73, see Fig. 4, carries a beveled gear 74 in turn meshing with a beveled gear 75 on a stub shaft 76. Fast to the shaft 76 is a sprocket 77 connected by a chain 78 to a sprocket 79 which is fast to a shaft 80, which may be considered the main drive shaft of the machine, in that it drives all the belts thereof. This shaft 80 is driven from a rack 81 as follows. Loosely mounted for free rotary movement on the shaft 80 is a pinion 82 in mesh with the rack 81. Fixed to the pinion 82, for rotary movement therewith, is a pawl 83. Fast to the shaft 80, as by means of a set screw 84, is a ratchet 85 for cooperation with the pawl 83. The ratchet is so set with respect to the pawl, that on downward movement of the rack 81, the pinion 82, together with the pawl, revolve idly on the shaft 80. On upward movement of the rack 81, however, the pawl and ratchet are so interlocked as to cause the ratchet to be rotated, carrying the shaft 80 and all belt driving gears thereon, with it, including the sprocket 79 heretofore mentioned, which drives the absorbent belt. The upward movement of the rack 81 is effected by compressed air in a cylinder 86, see Fig. 1, which has a piston therein, not shown, to which the rack 81 is affixed. Pressure in the cylinder 86 for this purpose becomes effective in the intervals between pressures of the platens, and together with the action of the platens, is controlled by means later to be described from a master valve 127, later to be explained. When the pressure in the air cylinder 86 is cut off, preliminary to operation of the platens, the rack 81 is drawn down or returned to home position by a spring 88, see Fig. 9. In this return movement of the rack the pawl 83 rides idly over the ratchet 85.

Due to the adhesive in the articles treated, the latter, instead of sticking to the conveyor belt 37, might on occasions stick to one or another of the upper platens, and to prevent this a thin steel belt 89, see Fig. 1, is provided. The lower reach of this belt passes between the upper and lower platens at each station and lies over the articles on the conveyor belt. The steel belt 89 is an endless belt which has intermittent movement in symphony with the movements of the conveyor belt. As the lower reach of belt 89 emerges at the rear of the machine it passes up and around a drive pulley 90 from which its upper reach extends over the upper platens to the front of the machine and over a pulley 91. The drive pulley 90 is fixed to a shaft 92, to which is also fixed a sprocket 93. This sprocket meshes with the chain 94 which at the lower part of the machine also engages a sprocket 95 affixed to a stub shaft 96 counter to the shaft 80. A pinion 97 fast to shaft 96 and which meshes with the pinion 98 fast to shaft 80 effects the intermittent movement of the thin steel belt whenever the shaft 80 is given its intermittent rotary movement by the rack 81 through the means hereinbefore described. As the articles 40 are fed out of the machine, they will ordinarily pass on the conveyor belt, but, if not on the conveyor belt, they will be found on the thin steel belt and can be easily removed therefrom.

It has been hereinbefore stated that the conveyor belt was fed from a delivery roll 33 to a pick-up roll 36 by means of rollers 38 at the upper part of the standard 30 at the rear of the machine. As distinguished from the other belts, the conveyor belt is not an endless belt because of the fact that it is necessary to remove it for cleaning. It is desirable to have delivery and take-up rolls 33 and 36 in duplicate, as indicated in Fig. 1, so that when a conveyor belt is to be removed for cleaning, the other rolls may be at once placed in use. In Fig. 1 there is shown an alternate delivery roll at 33' and alternate pick-up roll at 36'. The roll 33', like the roll 33, has its bearing in a bracket 31' on the front standard 28; and the alternate take-up roll on a shaft 99' having its bearing in the side plates 34 of the rear standard 30.

Figure 2:
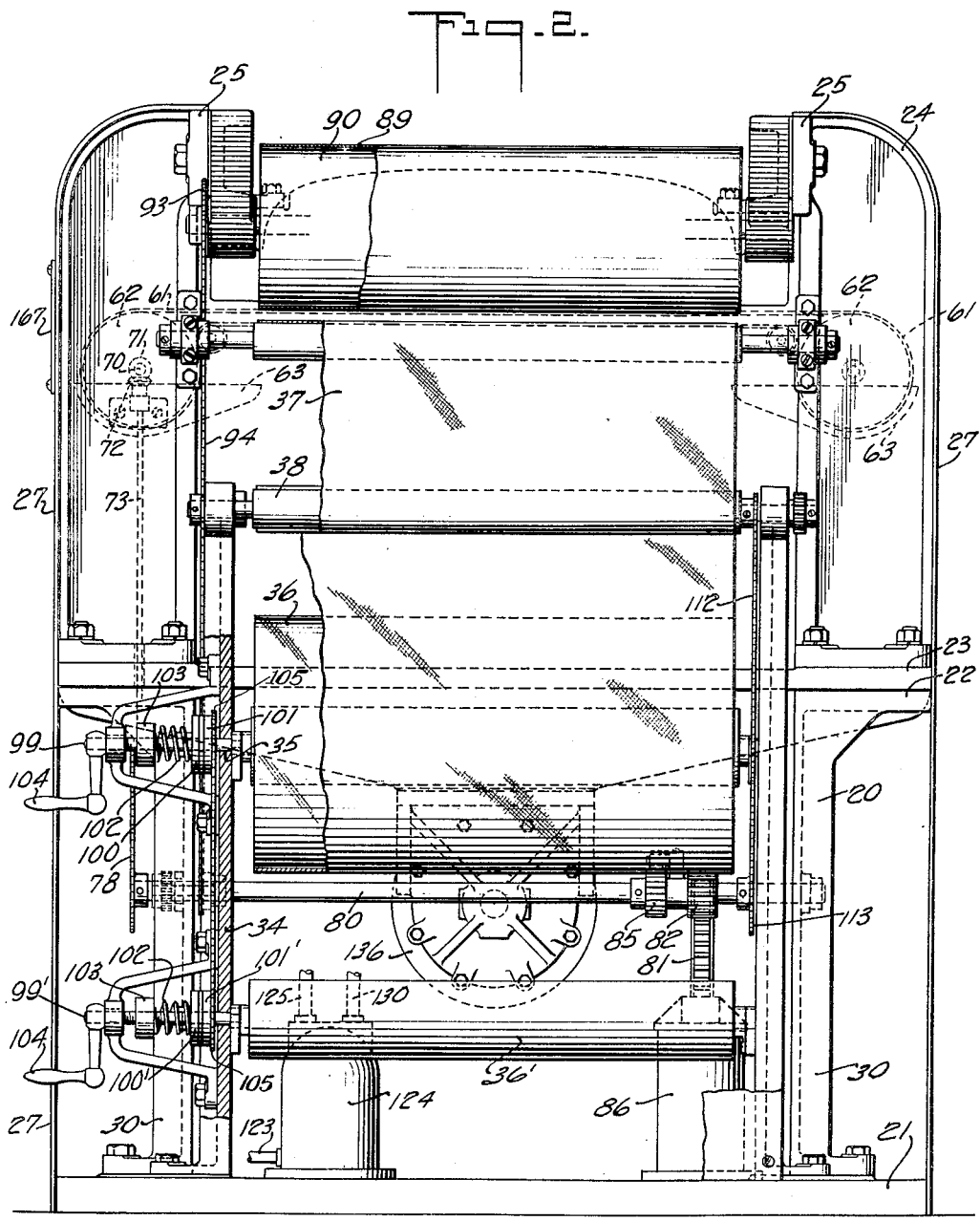
Fig. 2 is a view of the machine in end elevation, one of the end plates and other parts being broken away for clearer illustration of parts behind the same.

Due to the fact that the circumference of the take-up rolls 36 and 36' is a variable, these rolls have a friction drive, as indicated in Fig. 2. The shafts 99 and 99' have fast thereto one element of friction clutches 100 and 100'. Rotatably mounted on the shafts 99 and 99' are the other elements 101 and 101'. The friction clutch members are forced together by coil springs 102 which bear on the clutch members 101' and on elements 103. Handles 104 provide manual means for taking up slack in the conveyor belt.

The clutch members 101 and 101' are rotated in unison from the main drive shaft 80 by the following means. Each of the clutch members 101 and 101' has fast thereto a sprocket 105 and a chain 106 engages each of these sprockets and engages a sprocket 107, see Fig. 5, fast to the shaft 80. When, therefore, the shaft 80 receives its intermittent rotary movement, the clutch members 101 and 101' receive like movement. The chain 106 likewise passes over an idle sprocket 108 on an arm 109 having adjustable setting whereby the proper tension on the chain may be maintained.

The conveyor belt is turned about between its feed rollers 38, as shown in Fig. 1. On the shaft 110 with one of these rollers 38 is a sprocket 11, see Fig. 6, which meshes with the chain 112, which, see Fig. 2, in turn meshes with the sprocket 113 fixed to the drive shaft 80. When, therefore, the latter shaft receives its intermittent movement from the rack 81, the conveyor is advanced a distance equal to the station to station pitch of the presses.

As shown in Fig. 1, the conveyor, between the delivery roll 33 and the table 29, is passed around rollers 39. The tension is applied on the conveyor by means of roll 115 which is spring held against one of the rolls 39. The roll piece 115 is on one arm 117 of a bell crank lever pivoted at 118 in a side piece of the standard 28. The other arm 119 of the bell crank lever engages a rod 120 having a handle 121 and which is screw threaded to change the tension of a coil spring 122, which is on the rod and which bears against the arm 119 of the bell crank.

The pneumatic-hydraulic system whereby presses are operated, and whereby the rack 81 which effects the belt drives is operated, is as follows. The oil inlet line is indicated at 123. This line leads to an oil dome or reservoir 124. A compressed air inlet line is indicated at 125. This line also enters the dome 124 at the top thereof. A second compressed air inlet line is indicated at 126. This line enters the bottom of the cylinder 86 below the piston, not shown, therein. It is to this piston that the rack 81 is attached. These two compressed air lines and the oil line 123 are all controlled by a master valve 127 presently more specifically to be described. Suffice for the moment to say that in one setting of the valve 127 the oil line is cut off from the oil supply and the oil previously admitted therethrough to the reservoir 124 is subjected to compressed air pressure through the line 125. The pressure of the air entering the top of this reservoir through the line 125 forces oil through a line 128 which extends from the bottom of the dome or reservoir 124, and which is a continuation of the oil line 60, the branches 59 of which enter the platen cylinders 52 below the pistons 51 therein. There is a check valve 129 in the line 128—60, which is at this time open, so that on the aforesaid setting of the valve 127 oil under pressure from the reservoir 124 will pass through the check valve into the cylinders 52 to cause the lower platens to be lifted into contact with the upper platens.

When such contact of the platens occurs, the lower platens are arrested, and such arrest of the lower platens causes the air pressure in the reservoir 124 to be built up to line pressure. From the oil reservoir 124 another air line 130 extends to a valve 131, shown in detail in Fig. 12. Until line pressure, as aforesaid, is built up in the reservoir 124 by arrested movement of the lower platens, the valve 131 is closed. Sufficient pressure in the line 130 results in depression, with the aid of a spring 132, of a diaphragm 133 within the valve 131. The compressed air line 125 has a by-pass 134 to the valve 131 below the diaphragm 133; and also below the diaphragm 133 is an air outlet line 135 from the valve 131 to an air cylinder 136. The diaphragm 133 has, connected thereto, a stem 137 carrying a valve element 138 which controls the outlet from the valve to the line 135. In the normal position of the diaphragm 133 the outlet 135 to the cylinder 136 is closed by the valve element 138. Upon depression of the diaphragm 133, as aforesaid, the valve element 138 moves down to open the outlet 135 and to permit air at line pressure from the by-pass 134 of the line 125 to pass through the valve and through the outlet line 135 thereof, to the cylinder 136.

Within the cylinder 136 is a piston, not shown. Air line pressure amounting to one hundred pounds per square inch, or of any other desired pressure, will act upon the piston within the cylinder 135 to force the same leftward in Fig. 1. This piston has connected thereto a rod 140 the end 141 of which serves as a piston acting within an oil cylinder 142. A by-pass 143 connects the oil cylinder 142 with the oil line 128—60, and is at all times open so that the oil cylinder 142 is filled with oil when the master valve 127 opens the oil lines aforesaid. When now the high air line pressure is applied to the piston within cylinder 136 and through the rod 140 and the piston 141, is applied to the oil within the cylinder 142, the oil pressure in the line 60 to the platens is enormously increased to effect a squeeze pressure of the lower platens against the upper platens. This squeeze pressure of oil from the cylinder 142 causes the check valve 129 in the oil line 128 to be closed so that oil under squeeze pressure is not forced back into the air reservoir 124.

After the squeeze pressure has been applied to the lower platens, the platens are to be released for a station to station feed of the conveyor, and for movement of the other belts by the rack 81, as hereinbefore described. Therefore at this time the master valve, whether operated manually or by a timing mechanism, is set to open oil line 123 and to open air line 125 to exhaust, also opening the air line 135 from cylinder 136 to exhaust. Thereupon the piston 141, rod 140, and the piston within the air cylinder 136 move rightward to normal position. Oil from the platen cylinders 52 is then drained through lines 59, 60 and 144 to the master valve 127 and to the oil reservoir 124.

This setting of the master valve to release the platens also connects the line 126, leading to the rack operating cylinder 86, to the compressed air supply, resulting in upward movement of rack 81 to effect the belt movements hereinbefore described. When the valve 127 is again set to operate the platens, such setting opens the line 126 to exhaust, thereby permitting the spring 88, see Fig. 9, to return the rack 81 to normal position.

In Fig. 11 are shown diagrammatically the elements of the master valve 127, in the setting thereof for operating the platens and for exhausting the cylinder 86 for return to normal position of the rack 81. In this setting of the valve the oil line 123 is shown as cut off from a line 144—145 which leads to the oil supply, by a valve block 146 connected by a stem 147 to an operating bar 148.

In this same setting of the valve the compressed air line 125 is shown as open to a line 149 which leads to the compressed air supply, and is cut off from an exhaust opening 150 by a valve element 151 on a stem 152, also connected to the operating bar 148. Again, in this setting of the valve 127 the air line 126 which connects with the rack cylinder 86 is shown as cut off from a compressed air supply line 153 by a valve element 154 on a stem 155 also connected to the operating bar 148. The line 153 to the compressed air supply may be a fork of the line 149. At this time the air line 126 is open to an exhaust outlet 154'.

After the operation of the platens, the bar 148 is shifted to the left. This opens the oil line 123 to the oil supply, through a passage 156 in the valve block 146. At the same time it effects a movement of the valve element 151 which opens the compressed air line 125 to exhaust 150, and by a valve element 157 shuts off the air line 125 from the line 149 to the compressed air supply. The leftward movement of the bar 148 also, by reason of a valve element 160, closes the air line 126 to the exhaust 154', and by movement of the valve element 154 opens the air line 126 to the line 153 from the compressed air supply.

When the squeeze pressure is applied to the lower platen at station A, the substance which has been rendered adhesive by the solvent is squeezed into the plies of the articles 40 to unite such plies, and the excess solvent is drained into gutters 161 in the upper face of the lower platen, see Fig. 10, and thence through outlets 162, back into the troughs 63.

The lower platens are shown, see Fig. 3, as having paddings 163 mounted on plates 164. To permit replacement of these paddings, the plates 164 are removably mounted on the lower platens. For this purpose they have a slide connection with the lower platens and are offset at 165 so as to be held to the platens by studs 166. For removal of the platens, it is merely necessary to remove hand-hold covers 167, remove screws 166, and slide the plates 164 with the paddings 163 out through the hand-holds.

What I claim is:—

1. In a machine of the character described, a conveyor for articles to be treated, a plurality of stations at which the article is treated, means at the first of said stations for applying a solvent to the article, platens at said first station for effecting a squeeze pressure on the solvent treated article, platens at another station for hot pressing the solvent treated article to remove the solvent, and means for operating the presses and effecting a station to station movement of the conveyor between operations of the presses.

2. In a machine of the character described, a conveyor for articles to be treated, a plurality of stations at which the article is treated, means at the first of said stations for applying a solvent to the article, platens at said first station for effecting a squeeze pressure on the solvent treated article, platens at another station for hot pressing the solvent treated article to remove the solvent, and means for operating the presses simultaneously and effecting a station to station movement of the conveyor between operations of the presses.

3. In a machine of the character described, a conveyor for articles to be treated, a plurality of stations at which the article is treated, means at the first of said stations for applying a solvent to the article, platens at said first station for effecting a squeeze pressure on the solvent treated article, platens at two other stations for hot pressing the solvent treated article to remove the solvent, and means for operating the presses and effecting a station to station movement of the conveyor between operations of the presses.

4. In a machine of the character described, a conveyor for articles to be treated, a plurality of stations at which the article is treated, the first station having thereat a pair of platens between which the conveyor passes, a container for a solvent, an endless absorbent belt passed between the platens at right angles over the conveyor and article thereon and returned below the conveyor, and the other stations each having a pair of hot pressure platens for drying the solvent treated article, means for effecting an intermittent station to station movement of the conveyor in consonance with a movement of the absorbent belt, and means for operating the presses at moments when the conveyor and absorbent belt are at rest.

5. In a machine of the character described, a conveyor for articles to be treated, a plurality of stations at which the article is treated, means at the first of said stations for applying a solvent to the article, platens at said first station for effecting a squeeze pressure on the solvent treated article, platens at the other stations for hot pressing the solvent treated article to remove the solvent, means for operating the presses and effecting a station to station movement of the conveyor between operation of the presses, and a belt having movement in synchrony with the conveyor between the platens and spaced above the conveyor so that the articles on the latter will be below said belt and after pressure will emerge from the machine either on the conveyor or on said belt.

6. In a machine of the character described, a conveyer for articles to be treated, a plurality of stations at which the article is treated, means at the first of said stations for applying a solvent to the article, platens at said first station for effecting a squeeze pressure on the solvent treated articles, platens at the other stations for hot pressing the solvent treated article to remove the solvent, means for operating the presses and effecting a station to station movement of the conveyor between operations of the presses, an endless belt passed forward between the platens above and spaced from the conveyor and returned above the upper platens, and means for moving said belt in synchrony with the conveyor so that the articles on being pressed will emerge from the machine either on the conveyor or on said belt.

7. In a machine of the character described, a conveyor for articles to be treated, a plurality of stations at which the article is treated, means at the first of said stations for applying a solvent to the article, platens at said first station for effecting a squeeze pressure on the solvent treated articles, platens at the other stations for hot pressing the solvent treated article to remove the solvent, and means for operating the presses and effecting a station to station movement of the conveyor between operations of the presses, said platens being hollow and having steam connections to the interior thereof for heating the same.

8. In a machine of the character described, a conveyor for articles to be treated, a plurality of stations at which the article is treated, means at the first of said stations for applying a solvent to the article, platens at said first station for effecting a squeeze pressure on the solvent treated articles, platens at the other stations for hot pressing the solvent treated article to remove the solvent, and means for operating the presses and effecting a station to station movement of the conveyor between operations of the presses, the upper of said platens being fixed, and the lower ones having plungers for lifting the same, and hydraulic pressure cylinders containing pistons to which said plungers are connected.

9. In a machine of the character described, a conveyor for articles to be treated, a plurality of stations at which the article is treated, means at the first of said stations for applying a solvent to the article, platens at said first station for effecting a squeeze pressure on the solvent treated articles, platens at the other stations for hot pressing the solvent treated article to remove the solvent, and means for operating the presses and effecting a station to station movement of the conveyor between operations of the presses, the upper of said platens being fixed, and the lower ones having plungers for lifing the same, and hydraulic pressure cylinders containing pistons to which said plungers are connected, and a single hydraulic pressure line opening onto all of said lower cylinders for simultaneous operation of the presses.

10. In a machine of the character described, a conveyor for articles to be treated, a plurality of stations at which the article is treated, a compressed air line, pneumatically operated means connected to said line for effecting an intermittent, station to station, movement of the conveyor, a pair of platens at each station for pressing the articles, a liquid container through which to exert hydraulic pressure on the platens, means connected to said air line for exerting pneumatic pressure on the liquid in said container to operate the platens, and a valve in said air line operable to direct the air alternately to the conveyor moving means and to the platen actuating means.

11. In a machine of the character described, a conveyor for articles to be treated, a plurality of stations at which the article is treated, a compressed air line, pneumatically operated means connected to said line for effecting an intermittent, station to station, movement of the conveyor, a pair of platens at each station for pressing the articles, a liquid container through which to exert hydraulic pressure on the platens, means connected to said air line for exerting pneumatic pressure on the liquid in said container to operate the platens, and a valve in said air line operable to direct the air alternately to the conveyor moving means and to the platen actuating means, and a line also controlled by said valve for supplying the liquid for effecting the hydraulic pressure on the platens.

12. In a machine of the character described, a conveyor for articles to be treated, a plurality of stations at which the article is treated, a compressed air line, pneumatically operated means connected to said line for effecting an intermittent, station to station, movement of the conveyor, a pair of platens at each station for pressing the articles, a liquid container through which to exert hydraulic pressure on the platens, means connected to said air line for exerting pneumatic pressure on the liquid in said container to operate the platens, and a valve in said air line operable to direct the air alternately to the conveyor moving means and to the platen actuating means and to exhaust air from the other of said means.

13. In a machine of the character described, a conveyor for articles to be treated, a plurality of stations at which the articles are treated, means at one of said stations for applying a solvent to the articles, means at the other of said stations for drying the solvent treated articles under pressure and heat, and a partition between the first station and subsequent stages to exclude from the solvent applying station the heat employed at the drying station.

14. In a machine of the character described, a conveyor for articles to be treated, said articles each consisting of multiple plies of fabric and containing a substance that is capable of becoming adhesive when treated with a solvent, a plurality of stations at which the articles are treated, means at one of said stations for applying a solvent to the articles to render the substance contained therein adhesive and for squeezing the adhesive substance into the plies of the articles, and means at the other stations for applying pressure to unite the plies and heat to remove the solvent.

15. A machine of the character described, comprising platens, a reservoir for liquid, means in connection with said reservoir for closing the platens by hydraulic pressure, a source of compressed air opening into said reservoir for creating said platen closing pressure, and means for automatically increasing said hydraulic pressure to exert a squeeze on the platens after the latter have been closed.

16. A machine of the character described, comprising platens, a reservoir for liquid, means in connection with said reservoir for closing the platens by hydraulic pressure, a source of compressed air opening into said reservoir for creating said platen closing pressure, and means for automatically increasing said hydraulic pressure to exert a squeeze on the platens after the latter have been closed, said last named means being connected to the platen pressure line other than through the reservoir but being connected to the reservoir to be actuated when the air pressure in the latter is increased by stoppage of the platen closing movement.

17. A machine of the character described, comprising platens, a liquid container through which to exert hydraulic pressure on the platens, means for exerting pneumatic pressure on the liquid in said container to close the platens, and means for automatically increasing the pneumatic pressure on the liquid to exert a squeeze on the platens after the same have been closed.

18. A machine of the character described, comprising platens, a liquid container through which to exert hydraulic pressure on the platens, means for exerting pneumatic pressure on the liquid in said container to close the platens, a second means for exerting a higher or squeeze pressure on the platens after the same have been closed, a source of compressed air having connections to both of said pressure means, a valve which closes the air connection of the second means until the platens are closed, and a by-pass from the first pressure means to said valve for opening the latter when the air pressure in the first pressure means is increased by stoppage of the closing movement of the platens.

BENJAMIN LIEBOWITZ.